United States Patent
Rakvic et al.

(10) Patent No.: US 7,120,749 B2
(45) Date of Patent: Oct. 10, 2006

(54) CACHE MECHANISM

(75) Inventors: Ryan Rakvic, Palo Alto, CA (US);
Youfeng Wu, Palo Alto, CA (US);
Bryan Black, Austin, TX (US); John Shen, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 316 days.

(21) Appl. No.: 10/803,452

(22) Filed: Mar. 18, 2004

(65) Prior Publication Data

US 2005/0210197 A1   Sep. 22, 2005

(51) Int. Cl.
*G06F 12/12* (2006.01)

(52) U.S. Cl. ..................................................... 711/133
(58) Field of Classification Search ................ 711/120, 711/133
See application file for complete search history.

(56) References Cited

U.S. PATENT DOCUMENTS

| 6,668,306 B1* | 12/2003 | Rakvic et al. .............. 711/120 |
| 6,865,736 B1* | 3/2005 | Holmberg et al. .......... 717/158 |
| 2001/0021959 A1 | 9/2001 | Holmberg et al. |

OTHER PUBLICATIONS

PCT Search Report, PCT/US2005/008337, mailed Jul. 13, 2005.

* cited by examiner

*Primary Examiner*—Kevin L. Ellis
(74) *Attorney, Agent, or Firm*—Blakely, Sokoff, Taylor & Zafman LLP

(57) ABSTRACT

According to one embodiment a system is disclosed. The system includes a central processing unit (CPU), a first cache memory coupled to the CPU to store only data for vital loads that are to be immediately processed at the CPU, a second cache memory coupled to the CPU to store data for semi-vital loads to be processed at the CPU, and a third cache memory coupled to the CPU, the first cache memory and the second cache memory to store non-vital loads to be processed at the CPU.

23 Claims, 3 Drawing Sheets

CACHE MECHANISM

FIELD OF THE INVENTION

The present invention relates to integrated circuits; more particularly, the present invention relates to interfacing integrated circuits.

BACKGROUND

Almost all computer systems currently in existence implement a cache memory system. A cache memory is typically a random access memory (RAM) that a computer microprocessor accesses more quickly than it can access main memory. As the microprocessor processes data, it looks first in the cache, and if it finds the data in the cache, the microprocessor does not have to do the more time-consuming reading of data from larger main memory.

Typically, computer systems implement a conventional cache organization that implements caches L1 through L2 or L3. When processing data, the microprocessor first looks in the L1 cache for the data. If the data is not found in the L1 cache, the L2 cache is searched for the data. Finally the L3 cache is searched if the data is not found in the L2 cache.

A problem with the conventional cache organization is that data associated with various instructions are more critical than others, and thus need to be processed faster (e.g., 1 latency cycle). However, conventional cache operation does not account for the fast retrieval of such critical data from the cache system. For example, both critical data and non-critical data (e.g., data requiring up to 4 latency cycles) may be stored in the L1 cache. Storing non-critical data at the fast L1 cache is inefficient because it reduces the number of critical loads data that may be stored in the L1 cache. Thus, the larger, slower L2 or L3 caches must be searched to retrieve critical data that will are not stored within the L1 cache, exceeding the 1 latency cycle.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

A cache mechanism is described. According to one embodiment, the cache mechanism features a modified cache hierarchy that includes a vital cachelet that does not cache data for semi-vital and non-vital loads. This enables the vital cachelet to be more efficiently utilized by a smaller set of loads (e.g., vital loads). Similarly, a semi-vital cachelet does not cache data for non-vital loads. In a further embodiment, loads are directly assigned to the various cachelets, which are accessed in parallel by different loads. Further, load. assignment is performed statically, and load/store units can be directly attached to the cachelets.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
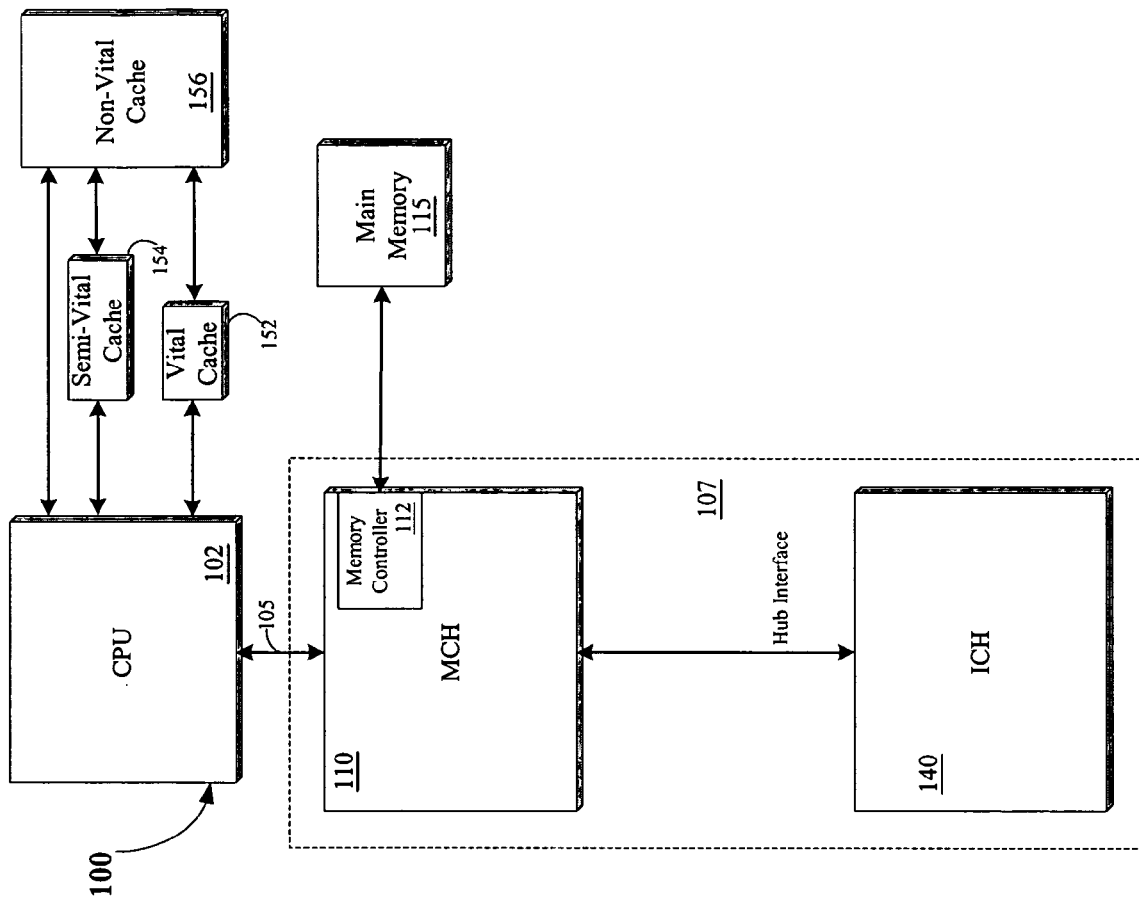
FIG. 1 illustrates one embodiment of a computer system.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention FIG. 1 is a block diagram of one embodiment of a computer system 100. Computer system 100 includes a central processing unit (CPU) 102 coupled to bus 105. In one embodiment, CPU 102 is a processor in the Pentium® family of processors including the Pentium® II processor family, Pentium®) III processors, and Pentium®-IV processors available from Intel Corporation of Santa Clara, Calif. Alternatively, other CPUs may be used.

A chipset 107 is also coupled to bus 105. Chipset 107 includes a memory control hub (MCH) 110. In one embodiment, MCH 110 is coupled to an input/output control hub (ICH) 140 via a hub interface. ICH 140 provides an interface to input/output (I/O) devices within computer system 100. For instance, ICH 140 may be coupled to a Peripheral Component Interconnect bus adhering to a Specification Revision 2.1 bus developed by the PCI Special Interest Group of Portland, Oreg.

In one embodiment, MCH 110 includes a memory controller 112 that is coupled to a main system memory 115. Main system memory 115 stores data and sequences of instructions and code represented by data signals that may be executed by CPU 102 or any other device included in system 100. In one embodiment, main system memory 115 includes dynamic random access memory (DRAM); however, main system memory 115 may be implemented using other memory types.

According to one embodiment, cache memories 152, 154 and 156 are coupled to CPU 102. In a further embodiment, caches 152, 154 and 156 implement a novel cache organization that provide load data to CPU 102 as the data is needed by dependent instructions. Thus, the number of tardy data arrivals at CPU 102 is reduced and caches are more efficiently utilized, resulting in improved CPU performance.

In one embodiment, loads are classified by vitality, and are directly assigned to caches 152, 154 and 156, which are small and fast caches, referred to as cachelets. In a further embodiment, the cachelets are designed with different latencies to better track load behavior. Load vitality is defined based on the distance between a load and its use (e.g., load-use distance).

According to one embodiment, loads are classified into three classes: vital (use immediately), semi-vital (use in 2 to 3 cycles), and non-vital (no use for at least 4 cycles). These loads are then assigned to appropriately timed cachelets: cache 152 (e.g., vital cachelet (single cycle)), cache 154 (e.g., semi-vital cachelet (2 cycles)), and cache 156 (e.g., the non-vital cache (4 cycles)). Although described herein with respect to three cachelets, one of ordinary skill in the art will appreciate that other quantities of cachelets (e.g., 4, 5, 6, etc.) may be implemented.

In one embodiment, cache 152 is a very fast (e.g., 1 cycle latency) and very small (e.g., 256 B) cache that stores data only for vital loads. Cache 152 is placed in parallel with cache 154, which is a fast (e.g., 2 cycle latency) and small (e.g., 1 KB) cache. Load data that is needed immediately is assigned to the single cycle cache 152. Loads that are semi-vital are assigned directly to cache 154. In one embodiment, cache 152 and cache 154 together operate at the same level in the cache hierarchy. All non-vital loads are assigned to cache 156 that has a 4-cycle latency. If a vital load misses cache 152, it then accesses cache 156.

According to one embodiment, allocation of data is carried out based on load classification. Thus, vital loads update cache 152 and cache 156, while semi-vital loads update the cache 154 and cache 156. Non-vital loads allocate data in cache 156. Note that a coherence issue may occur between cache 152 and cache 154 because both may have the same data simultaneously.

To accommodate this, stores are broadcasted to both cache 152 and 154, as well as cache 156. Such store bandwidth is not a performance limiter. This on-demand allocation and replication allows the caches to be more efficiently utilized. The inclusion principle that is evident in a conventional cache organization is not enforced between caches 152 and 154. Thus, there is more effective cache space with in the disclosed system when compared to a conventional cache organization.

To implement the disclosed cache mechanism, load classification is to be performed prior to cache access. In one embodiment, a compiler performs load classification. However in other embodiments, load classification may be performed using other software, or hardware mechanisms. The compiler knows the distance between most loads and their uses. Consequently, the compiler does an effective job at vitality classification.

Figure 2:
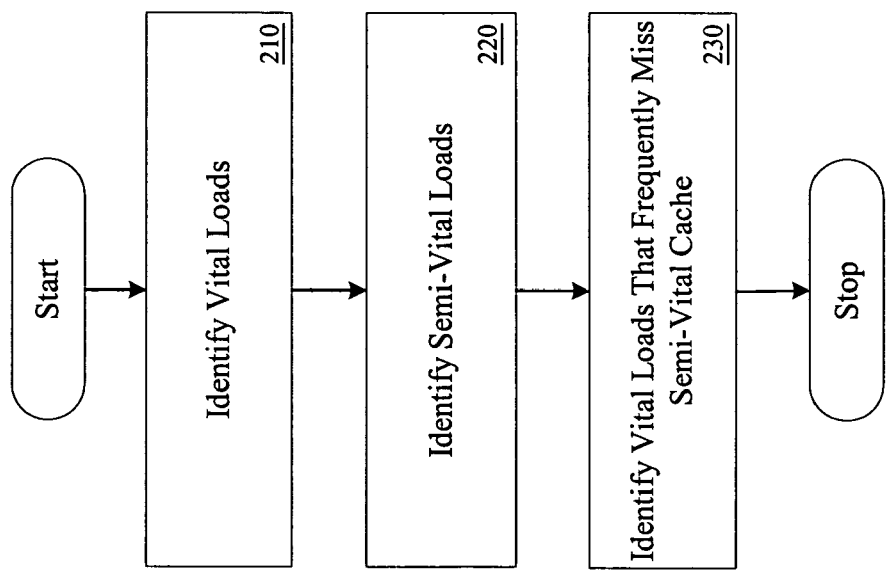
FIG. 2 is a flow diagram for one embodiment of load classification.

FIG. 2 is a flow diagram for one embodiment of load classification. At processing block 210, vital loads are identified. In one embodiment, vital loads are identified by filtering out all loads with a dependence distance greater than 1 cycle. Within this process, there is a pre-scheduling phase and a post-scheduling phase to maximize non-vital classification. Subsequently, profiling is performed to identify the remaining loads that miss frequently in cache 152 and lines that are not reused.

At processing block 220, semi-vital loads are identified. In one embodiment, information from the vital load identification and profiling are used to determine the semi-vital loads. Profiling is again performed to identify the loads that miss frequently in cache 154 and lines that are not reused. At processing block 230, non-vital loads are identified. In one embodiment, the profile information from vital load and semi-vital identification is used to determine the loads that frequently miss in cache 154 and with cache lines that are not reused.

Figure 3:
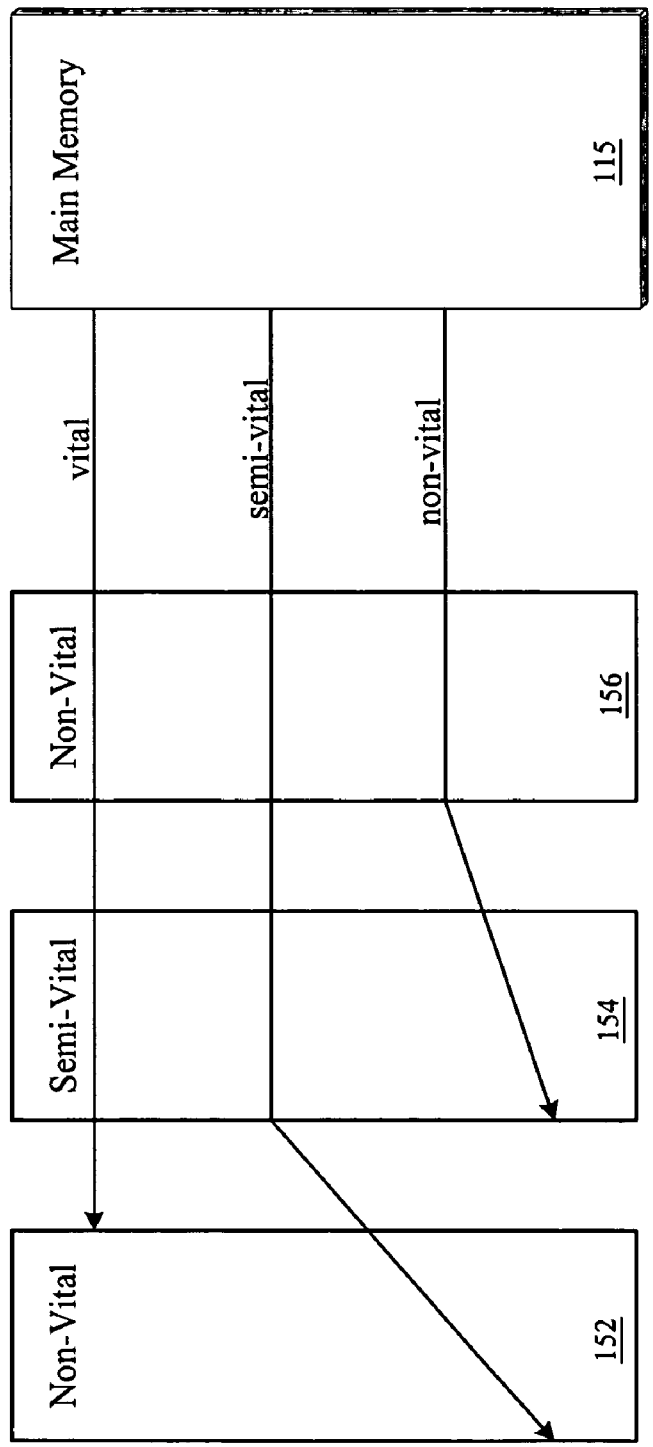
FIG. 3 illustrates one embodiment of load placement within cache memories.

FIG. 3 illustrates one embodiment of load placement within cache memories 152, 154 and 156. As shown in FIG. 3, vital loads are stored in cache 152, while semi-vital and non-vital loads are stored at caches 154 and 156, respectively.

The above-described cache mechanism features a reorganized and optimized data cache hierarchy that takes advantage of the fact that not every load data is needed immediately. Thus, assignment of a load to the cache hierarchy is not done with the traditional top-down approach. Instead the assignment of a load and the allocation of its data is performed by a vitality classifier. Non-vital loads are assigned to the slowest cache, and the more vital load(s) are assigned to the fast and small cache(s). The fast and small cache(s) only allocate data for the more vital loads, and provide a high hit rate for these loads.

The cache mechanism benefits from the direct assignment of loads to the various cachelets, and provides more bandwidth to the CPU core since the cachelets are accessed in parallel by different loads. Another benefit of the cache mechanism is the cache access latency. Load assignment is performed statically, and load/store units can be directly attached to the cachelets.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. A system comprising:
   a central processing unit (CPU);
   a first cache memory, coupled to the CPU, to store only data for vital loads that are to be immediately processed at the CPU;
   a second cache memory, coupled to the CPU and the first cache, to store non-vital loads to be processed at the CPU; and
   a third cache memory, coupled to the CPU and the second cache memory, to store data for semi-vital loads to be processed at the CPU, wherein vital loads update the first cache memory and the second cache memory.

2. The system of claim 1 wherein the CPU accesses to the first cache memory, the second cache memory and the third cache memory in parallel.

3. The system of claim 1 wherein vital loads are directly assigned to the first cache memory, semi-vital loads are directly assigned to the third cache memory and non-vital loads are directly assigned to the second cache memory.

4. The system of claim 3 wherein the assignment of the loads to the respective caches is performed statically.

5. The system of claim 4 wherein the assignment of the loads is performed at a compiler.

6. The system of claim 1 wherein vital loads are to be processed at the CPU within one clock cycle.

7. The system of claim 6 wherein semi-vital loads are to be processed at the CPU within three clock cycles.

8. The system of claim 7 wherein non-vital loads are not to be processed at the CPU for at least four clock cycles.

9. The system of claim 1 wherein the first cache memory is a 265 B cache and the third cache memory is a 1 KB cache.

10. The system of claim 9 wherein the second cache memory is physically larger than the third cache memory.

11. The system of claim 1 wherein the first cache memory and the third cache memory operate at the same level in cache hierarchy.

12. The system of claim 1 wherein semi-vital loads update the third cache memory and the second cache memory.

13. The system of claim 12 wherein non-vital loads update the second cache memory.

14. A method comprising:
   identifying load instructions having a first vitality level by filtering out load instructions having a dependence distance greater than a predetermined clock cycle;
   identifying load instructions having a second vitality level; assigning load instructions having the first vitality level to be stored in a first cache memory; and
   assigning load instructions having the second vitality level in a second cache memory;
   identifying load instructions having a third vitality level after identifying load instructions having the first vitality level; and assigning load instructions having the third vitality level to be stored in a third cache memory, wherein vital loads update the first cache memory and the second cache memory.

15. The method of claim 14 further comprising performing a profile, after identifying the load instructions having the first vitality level, to identify the remaining load instructions that frequently miss in the first cache memory and lines that are not used.

16. The method of claim 14 further comprising performing a profile, after identifying the load instructions having the third vitality level, to identify the remaining load instructions that frequently miss in the third cache memory and lines that are not used.

17. A computer system comprising:
a central processing unit (CPU);
a first cache memory, coupled to the CPU, to store only data for vital loads that are to be immediately processed at the CPU;
a second cache memory, coupled to the CPU, to store data for semi-vital loads to be processed at the CPU
a third cache memory, coupled to the CPU the first cache memory and the second cache memory, to store non-vital loads to be processed at the CPU, wherein vital loads update the first cache memory and the third cache memory;
a chipset coupled to the CPU; and
a main memory device coupled to the chipset.

18. The system of claim 17 wherein the CPU accesses to the first cache memory, the second cache memory and the third cache memory in parallel.

19. The system of claim 18 herein vital loads are directly assigned to the first cache memory, semi-vital loads are directly assigned to the second cache memory and non-vital loads are directly assigned to the third cache memory.

20. The system of claim 19 wherein vital loads are to be processed at the CPU within one clock cycle, the semi-vital loads are to be processed at the CPU within three clock cycles and non-vital loads are not to be processed at the CPU for at least four clock cycles.

21. The system of claim 19 wherein the first cache memory and the second cache memory operate at the same level in cache hierarchy.

22. The system of claim 17 wherein semi-vital loads update the second cache memory and the third cache memory.

23. The system of claim 22 wherein non-vital loads update the third cache memory.

* * * * *

UNITED STATES PATENT AND TRADEMARK OFFICE
CERTIFICATE OF CORRECTION

| | | |
|---|---|---|
| PATENT NO. | : 7,120,749 B2 | Page 1 of 1 |
| APPLICATION NO. | : 10/803452 | |
| DATED | : October 10, 2006 | |
| INVENTOR(S) | : Rakvic et al. | |

It is certified that error appears in the above-identified patent and that said Letters Patent is hereby corrected as shown below:

In column 6, at line 7, delete "herein" and insert --wherein--.

Signed and Sealed this

Twenty-seventh Day of March, 2007

JON W. DUDAS
*Director of the United States Patent and Trademark Office*